UNITED STATES PATENT OFFICE 2,858,191
Patented Oct. 28, 1958

2,858,191

PRODUCTION OF GASES RICH IN SULFUR DIOXIDE SUITABLE FOR WORKING UP INTO SULFURIC ACID

Adolf Johannsen, Ludwigshafen (Rhine), Willi Danz, Ludwigshafen (Rhine), Oggersheim, Wilhelm Pfannmueller, Mannheim, and Herbert Wolf, Ludwigshafen (Rhine), Germany, assignors to Badische Anilin- & Soda-Fabrik Aktiengesellschaft, Ludwigshafen am Rhine, Germany No Drawing. Application May 22, 1951
Serial No. 227,752

Claims priority, application Germany August 8, 1950

1 Claim. (Cl. 23—177)

This invention relates to the production of gases rich in sufur dioxide suitable for working up into sulfuric acid.

We have found that by the roasting of iron pyrites with the simultaneous thermal decomposition of sulfuric acid or liquids containing sulfuric acid, as for example waste sulfuric acid of any concentration, such as waste acids containing resins and resulting from the purification of hydrocarbon compounds with sulfuric acid, waste liquors containing sulfates, such as pickling liquors, it is possible to prepare roaster gases rich in sulfur dioxide which can be converted with advantage into concentrated sulfuric acid and oleum, by introducing the said masses containing sulfuric acid into a layer consisting predominately of substantially roasted iron pyrites which is maintained in an up-and-down whirling motion by leading therethrough upwardly oxygen-containing gases and to which continuously or periodically iron pyrites is supplied and the corresponding amount of roasted ore and/or flue dust is withdrawn, the excess of roasting heat which is not necessary for maintaining the roasting temperature serving wholly or in part for the carrying out of the endothermic splitting reaction, the temperature in the reaction layer thus being kept below the softening point of the substantially roasted material, if necessary with additional measures for withdrawing heat, and by withdrawing the sulfur dioxide formed by the decomposition of the masses containing sulfuric acid together with the sulfur dioxide formed by the action of the oxygen thus set free on the iron pyrites and together with the sulfur dioxide formed by the roasting process itself, and exploiting the same, in particular by working up the gases rich in sulfur dioxide into concentrated sulfuric acid by catalytic oxidation after having added gases containing oxygen to the sulfur dioxide-containing gases.

The temperature to be maintained in the whirling layer depends on the softening point of the roasted ore of the kind of iron pyrites being worked up. In the case of working up commercial Spanish iron pyrites, temperatures of from about 800° to 900° C. are applicable, and in the case of sulfur minerals containing iron and zinc in sulfidic form temperatures of from about 1000° to 1100° C. Generally speaking, the temperature should not be below 700° C. The thermally-coupled reactions which proceed simultaneously in the whirling layer may be represented by the following equations given by way of example for the case where a sulfuric acid corresponding to the composition $H_2SO_4 \cdot H_2O$ (84.6% of $H_2SO_4$) is split while employing air as the roasting agent:

(1)
$$11H_2SO_4 \cdot H_2O = 11SO_2 + \frac{11}{2}O_2 +$$
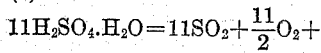
$$22H_2O - 904.2 \text{ kcal. (kilogram-calories)}$$

(2) $2FeS_2 + \frac{11}{2}O_2 = Fe_2O_2 + 4SO_2 + 411 \text{ kcal.}$ (1+2)
$11H_2SO_4 \cdot H_2O + 2FeS_2 = Fe_2O_3 + 15SO_2 +$
$$22H_2O - 493.2 \text{ kcal.}$$

(3)
$8FeS_2 + 22O_2 + 22 \cdot \frac{79.1}{20.9}N_2 = 4Fe_2O_3 +$
$$16SO_2 + 22\frac{79.1}{20.9}N_2 + 1644 \text{ kcal.}$$

(4)
$10FeS_2 + \text{gangue} + 11H_2SO_4 \cdot H_2O +$
   1200 g.   150 g.      1276 g.
$22O_2 + 3.78 \times 22 \text{ N}_2 = 5Fe_2O_3 + \text{gangue} +$
  704 g.    2330 g.       799 g.      150 g.
$$31SO_2 + 83.2 \text{ N}_2 + 22H_2O + 1150.8 \text{ kcal.}$$
  1984 g.    2330 g.     396 g.

The heat set free according to the entire Reaction 4 is sufficient to heat all the reaction products from ordinary temperature to about 870° C. and to cover the heat loss amounting to about 5 percent in the case of compact reaction systems of technical dimensions. Under the said conditions, the maximum sulfur dioxide concentration (calculated with reference to the dry roaster gas) is calculated at about 27 percent $SO_2$ when about 950 kilograms of waste sulfuric acid containing 84.6 percent of $H_2SO_4$ is worked up together with 1000 kilograms of pyrites. This calculates to be a sulfuric acid:pyrite ratio of 0.804:1. In practice this value is not quite reached because on the one hand it is not possible to reduce the oxygen content of the roaster gas quite to zero and on the other hand the splitting Reaction 1 under the catalytic influence of the roasted pyrites cannot be completely carried out, corresponding to the equilibrium conditions. Sulfur dioxide concentrations of about 20 percent and more can, however, be obtained with ease. It is preferable to work with whirling layers the height of which, in the quiescent state, amounts to more than 50 centimetres and to spray in the sulfuric acid to be worked up into the upper part of the layer over the whole cross-section of the whirling layer which may be cylindrical or annular in arrangement. The hourly throughput per square metre of roasting surface may for example be increased up to 1.5 metric tons of pyrites, and the temperature may be kept at the height permissible for the kind of pyrites being worked up by dosing the amount of sulfuric acid supplied for splitting.

Undecomposed sulfur trioxide, which escapes in subordinate amounts from the whirling layer, is combined as iron sulfate by the entrained roasted ore dust. This dust may if desired be supplied to the whirling layer with the iron pyrites so that the iron sulfate is again subjected to splitting.

The sensible heat of the roaster gases leaving at a temperature of about 870° C. may be utilized for the production of steam in waste heat boilers down to a temperature of about 250° C. The further working up of the gases may be carried out advantageously as follows: The gas is freed from dust in cyclones or electrical gas-purifying plants and cooled by indirect air systems or by spraying in water, the water in the latter case being withdrawn as hot as possible, for example at 90° C., in order to avoid waste of sulfur dioxide. The acid mist which forms upon cooling is separated by electrostatic treatment of the gas. The moist gases rich in sulfur dioxide and poor in oxygen may then be used directly for the production of aqueous sulfurous acid, sulfites, bisulfite solutions, hyposulfites, hydroxymethanesulfinic acid salts or the like. After being dried in the usual way with sulfuric acid, they may find advantageous employment for the recovery of commercially pure sulfur dioxide by the known processes of deep cooling, absorption or adsorption at atmospheric or increased pressure. The high content of sulfur dioxide in the gases renders possible a substantial improvement in the degree of efficiency of these processes.

For the preparation of sulfuric acid according to the chamber process or according to the process of wet catalysis while employing the roaster gases poor in oxygen obtained according to the present invention, it is necessary to add to such roaster gases oxygen in the form of oxygen-containing gases, in particular air, in amounts sufficient for the conversion of tetravalent sulfur into hexavalent sulfur. Generally speaking, the sulfur dioxide and oxygen concentrations suitable for the process in question may be obtained solely by the addition of air.

For carrying out the catalytic process for the production of sulfuric acid and oleum, a drying of the highly concentrated roaster gas and also of the added oxygen-containing gases is necessary, provided the latter, as for example in the case of oxygen obtained by liquefaction of air, is not already available in the dry state. If atmospheric air is added, this is preferably separately dried, sulfuric acid being used for the drying which has previously served for the drying of the roaster gas and has thereby absorbed relatively large amounts of sulfur dioxide corresponding to the high partial pressure of the sulfur dioxide in the roaster gas. During the drying process, the air blows the dissolved sulfur dioxide out from the sulfuric acid and this amount of sulfur dioxide can thus also be utilized for the catalytic oxidation. The acid diluted by the absorption of water is re-concentrated in the usual way in the sulfuric acid absorbers.

For example by mixing a roaster gas containing 24 percent of sulfur dioxide and 4 percent of oxygen with an equal amount of air, a gas may be obtained containing 12 percent of sulfur dioxide and 12 percent of oxygen, the composition of which approximately corresponds to that of gases obtained by burning sulfur with air and which may be worked up to sulfuric acid in the same way as these while utilizing the heat of reaction for the production of steam.

Instead of the said waste sulfuric acid containing 84.6 percent of $H_2SO_4$, waste acids of lower concentration, as for example the up to about 30 percent acid obtained at the anode in the electrolysis of sodium sulfate or denitrated waste acids from nitration processes, may also be used. Similarly sulfuric acid-containing iron sulfate solutions, such as drenching liquors, and other solutions containing sulfuric acid or thermally decomposable sulfates, may also be used for the recovery of sulfur dioxide. Waste products which contain, in addition to sulfuric acid, organic substances, as for example the resin-like wastes obtained in the purification of hydrocarbon liquids with sulfuric acid, may also be worked up. In some cases it may be necessary to provide additional means for withdrawing heat from the whirling layer in order to prevent the temperature from rising above the softening point of the substantially roasted product. The catalytic activity of the roasted ore renders possible a complete combustion of the organic contaminants, provided the height of the whirling layer is sufficient and sufficient roasting air is supplied, so that contamination of the roaster gas with such substances is avoided.

According to the present invention it is also possible to work up such sulfur minerals as contain iron and zinc in sulfidic form and the composition of which corresponds approximately to a mixture of 75 percent of $FeS_2$ and 11 percent of $ZnS$ in addition to 12 percent gangue and 2 percent of other impurities. In these cases the roasted material has a high softening point, so that the combined roasting and decomposition reaction may be carried out at temperatures above 1000° C. up to nearly 1100° C. In this way a practically complete decomposition of the introduced sulfuric acid and at the same time a dead-roasting of these minerals (which are difficult to roast by reason of their zinc content) is obtained so that the roasted ore obtained may be directly employed for being worked up to iron.

The process according to this invention offers the following considerable technical advantages.

The heat which must be consumed for the recovery of the sulfur dioxide by splitting waste materials containing sulfuric acid is provided by the excess roasting heat of the pyrites which in the roasting processes hitherto usual was lost.

There is no contamination of the roaster gases so as is the case in the known splitting processes by reason of the formation of combustion products foreign to the roaster products from the fuels necessary to provide the heat for the splitting.

There are no difficulties as regards structural materials since the roasting and decomposition reaction can be carried out in reaction vessels lined with ceramic material without any inserts of metallic materials in the hot reaction zone being necessary.

The process renders it possible, while using air as the roasting agent, to prepare high-percentage roaster gases with a sulfur dioxide content of more than 16 percent on the basis of pyrites, such as otherwise could only be obtained by combustion of sulfur or by employing oxygen or air enriched with oxygen.

The production of such high-percentage roaster gases renders possible a more economical utilization of their sensible heat for the production of steam and a considerable reduction in size, amounting to 50% and more, of the plant necessary for removal of dust and purification, for the same throughput with reference to the useful product.

The process renders possible the sole production of oleum in that the sulfuric acid which is necessarily formed, besides oleum, in the usual catalytic processes, is reconverted into sulfur dioxide.

The following example will further illustrate this invention but the invention is not restricted to this example.

*Example*

Into a layer of substantially roasted material, which in the quiescent state has a height of about 55 centimetres, there are introduced per hour per square metre of area 1250 kilograms of Spanish iron pyrites having a sulfur content of about 48 percent and a grain size up to about 4 millimetres. Into the expansion zone of the whirling layer, at a height of about 65 centimetres, there are sprayed in 606 kilograms of sulfuric acid contaminated with organic substances and having a content of 96 percent $H_2SO_4$, per hour per square metre of area, the acid being dispersed as far as possible uniformly over the cross-section of the furnace by means of nozzles. The acid:pyrites ratio calculates to be 0.465:1. 2620 cubic metres of air per hour per square metre of the area are led in through the grate below the whirling layer. A temperature of 890° to 910° C. prevails in the whirling layer. The roaster gas leaving the furnace has an average sulfur dioxide content of 20.6 percent and is practically free from oxygen; its sulfur trioxide content lies between 3.45 and 4.27 grams per cubic metre. The sulfuric acid sprayed in has thus been practically completely split.

The iron pyrites introduced into the whirling layer undergoes a substantial comminution by decrepitation and almost the whole of the amount of roasted ore corresponding to the iron pyrites introduced is entrained as dust by the roaster gases, the height of the whirling layer thus remaining constant. The roasted ore entrained as dust by the roaster gases and later precipitated has a sulfur content of 0.35 percent; a sample withdrawn from the upper parts of the whirling layer contains 0.65 percent of sulfur.

An apparatus suitable for the practice of the invention is described in copending application Serial No. 215,832, filed March 15, 1951, now abandoned.

What we claim is:

A process for working up a liquid containing sulfuric acid which comprises spraying said liquid into the upper part and over the cross-section of a layer consisting of unroasted and mainly of substantially roasted particles of iron pyrites undergoing roasting, said layer having a height in the quiescent state greater than 50 centimetres, passing air upwardly through said layer to maintain said particles in random turbulent motion within the confines of the layer, adding comminuted iron pyrites to the layer in an amount up to about 1.5 metric tons per hour per square metre of roasting surface and withdrawing corresponding amounts of roasted material from the same, said liquid being sprayed into the layer in an amount sufficient to supply about 0.465 to 0.804 parts by weight of sulfuric acid per part of said comminuted pyrites added, and maintaining the temperature of said layer at about 800° C. to 1100° C. and below the softening point of the substantially roasted material by adjusting the amount of said liquid sprayed into the layer relative to the amount of said comminuted pyrites added, said air being passed through said layer in an amount at least sufficient to supply the oxygen necessary for roasting said pyrites with the formation of oxidic roasted material and not supplied by the decomposition of the contents of said liquid.

References Cited in the file of this patent

UNITED STATES PATENTS

| | | |
|---|---|---|
| 1,008,847 | Meyer | Nov. 14, 1911 |
| 1,459,084 | Bezanson | June 19, 1923 |
| 1,941,592 | Bacon et al. | Jan. 2, 1934 |
| 2,044,419 | Clark | June 16, 1936 |
| 2,047,995 | Cordy et al. | July 21, 1936 |
| 2,066,896 | Merriam | Jan. 5, 1937 |
| 2,070,235 | Mullen | Feb. 9, 1937 |
| 2,174,185 | Carter | Sept. 26, 1939 |
| 2,467,855 | Read | Apr. 19, 1949 |
| 2,591,595 | Ogorzaly | Apr. 1, 1952 |
| 2,621,118 | Cyr | Dec. 9, 1952 |

FOREIGN PATENTS

| | | |
|---|---|---|
| 161,581 | Great Britain | Sept. 11, 1922 |

UNITED STATES PATENT OFFICE
Certificate of Correction

Patent No. 2,858,191                                      October 28, 1958

Adolf Johannsen et al.

It is hereby certified that error appears in the printed specification of the above numbered patent requiring correction and that the said Letters Patent should read as corrected below.

Column 2, line 1, in formula (2), for "$Fe_2O_2$" read $Fe_3O_4$; lines 9 and 10, in formula (3), for $$22 = \frac{79.1}{20.9} N_2 \quad \text{read} \quad 22 \frac{79.1}{20.9} N_2$$

Signed and sealed this 3rd day of February 1959.

[SEAL]

Attest:
KARL H. AXLINE,
*Attesting Officer.*

ROBERT C. WATS'
*Commissioner of P'*